US010142429B2

(12) United States Patent
Rosenblum et al.

(10) Patent No.: US 10,142,429 B2
(45) Date of Patent: Nov. 27, 2018

(54) WEB PRESENCE MANAGEMENT SYSTEM

(71) Applicant: CONDUCTOR, INC., New York, NY (US)

(72) Inventors: Joshua D. Rosenblum, Brooklyn, NY (US); Vishal R. Berry, New York, NY (US); Stephen Kim, Brooklyn, NY (US); Marina Yospe, Brooklyn, NY (US); Rajan Arora, Venice, CA (US)

(73) Assignee: CONDUCTOR, INC., New York, NY (US)

( * ) Notice: Subject to any disclaimer, the term of this patent is extended or adjusted under 35 U.S.C. 154(b) by 218 days.

(21) Appl. No.: 14/877,565

(22) Filed: Oct. 7, 2015

(65) Prior Publication Data
US 2016/0100020 A1    Apr. 7, 2016

Related U.S. Application Data

(60) Provisional application No. 62/061,112, filed on Oct. 7, 2014.

(51) Int. Cl.
*H04L 29/08*    (2006.01)
(52) U.S. Cl.
CPC .............. *H04L 67/24* (2013.01); *H04L 67/02* (2013.01)

(58) Field of Classification Search
CPC ................................ H04L 67/24; H04L 67/02
See application file for complete search history.

(56) References Cited

U.S. PATENT DOCUMENTS

| | | | |
|---|---|---|---|
| 2011/0314142 A1* | 12/2011 | Newton ............. | G06Q 30/0201 709/224 |
| 2012/0303430 A1* | 11/2012 | Tiku .................... | G06O 30/0207 705/14.17 |
| 2014/0108369 A1* | 4/2014 | Nijjer ...................... | H04L 63/08 707/706 |

* cited by examiner

*Primary Examiner* — Michael A Keller
(74) *Attorney, Agent, or Firm* — Moritt Hock & Hamroff LLP; Bret P. Shapiro

(57) ABSTRACT

Technologies are described for generating web presence data of an entity. In an example, a web presence processor may receive a request to generate the web presence data. The web presence processor may receive first and second service data relating to first and second web assets, respectively. The first web asset may be among a first set of web assets indexed by a first channel. The second web asset may be among a second set of web assets indexed by a second channel different from the first channel. The second set of web assets may be different from the first set of web assets. The web presence processor may further transform the first and second service data into the web presence data. The web presence processor may further cause an output of the web presence data on a display.

18 Claims, 4 Drawing Sheets

WEB PRESENCE MANAGEMENT SYSTEM

CROSS-REFERENCE TO RELATED APPLICATION

This application claims priority under 35 U.S.C § 119(e) to U.S. Provisional Application 62/061,112 filed on Oct. 7, 2014, the entirety of the provisional application is hereby incorporated by reference.

BACKGROUND OF THE INVENTION

In a search engine, a crawler aggregates pages from the Internet and ensures that these pages are searchable. The pages retrieved by the crawler are indexed by an indexer. For example, each web page may be broken down into words and respective locations of each word on the page. The pages are then indexed by the words and their respective locations. A user may send a search query to a dispatcher. The dispatcher may forward the query to search nodes. The search nodes search respective parts of the index and return search results along with a document identifier. The dispatcher merges the received results to produce a final result set displayed to a user sorted by ranking scores based on a ranking function. Users may modify web pages in an attempt to have their page appear higher in a result set for particular queries.

SUMMARY

In some examples, methods for generating web presence data of an entity are generally described. The methods may include receiving, by a web presence processor, a request to generate the web presence data relating to the entity. The methods may further include receiving, by the web presence processor, first service data. The first service data may relate to a first web asset of the entity. The first web asset may be among a first set of web assets indexed by a first channel. The first channel may be effective to produce a first search result. The methods may further include receiving, by the web presence processor, second service data. The second service data may relate to a second web asset of the entity. The second web asset may be among a second set of web assets indexed by a second channel. The second channel may be different from the first channel. The second set of web assets may be different from the first set of web assets. The second channel may be effective to produce a second search result. The methods may further include transforming, by the web presence processor, the first service data and the second service data into the web presence data. The web presence data may be effective to indicate one or more keywords and respective track status of the one or more keywords. The methods may further include causing, by the web presence processor, an output of the web presence data on a display.

In some examples, systems effective to generate web presence data of an entity are generally described. The systems may include a memory and a web presence processor. The web presence processor may be configured to be in communication with the memory. The web presence processor may be configured to receive a request to generate the web presence data relating to the entity. The web presence processor may be further configured to receive first service data. The first service data may relate to a first web asset of the entity. The first web asset may be among a first set of web assets indexed by a first channel. The first channel may be effective to produce a first search result. The web presence processor may be further configured to store the first service data in the memory. The web presence processor may be further configured to receive second service data. The second service data may relate to a second web asset of the entity. The second web asset may be among a second set of web assets indexed by a second channel. The second channel may be different from the first channel. The second set of web assets may be different from the first set of web assets. The second channel may be effective to produce a second search result. The web presence processor may be further configured to store the second service data in the memory. The web presence processor may be further configured to retrieve the first service data and the second service data from the memory. The web presence processor may be further configured to transform the first service data and the second service data into the web presence data. The web presence data may be effective to indicate one or more keywords and respective track status of the one or more keywords. The web presence processor may be further configured to store the web presence data in the memory. The web presence processor may be further configured to cause an output of the web presence data on a display.

In some examples, methods for generating web presence data relating to an entity are generally described. The methods may include sending, by a device, a request to a web presence processor to generate the web presence data relating to the entity. The methods may further include receiving, by the device, the web presence data from the web presence processor. The web presence data may be effective to indicate one or more keywords and respective track status of the one or more keywords. The web presence data may be based on a first transformation of first service data. The first service data may relate to a first web asset of the entity. The first web asset may be among a first set of web assets indexed by a first channel. The first channel may be effective to produce a first search result. The web presence data may be further based on a second transformation of second service data. The second service data may relate to a second web asset of the entity. The second web asset may be among a second set of web assets indexed by a second channel. The second channel may be different from the first channel. The second set of web assets may be different from the first set of web assets. The second channel may be effective to produce a second search result. The methods may further include outputting, by the device, the web presence data on a display.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

Figure 1:
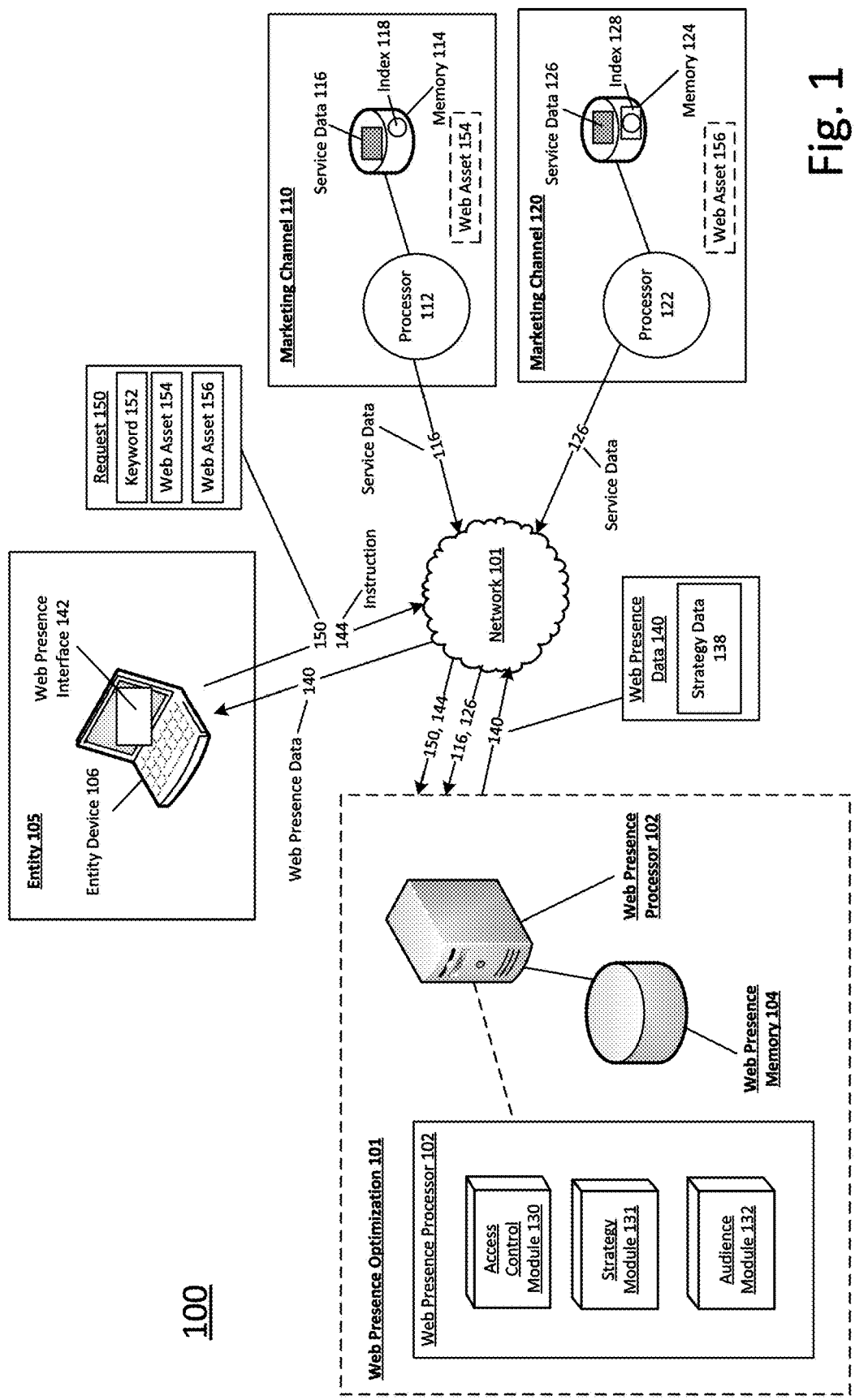
FIG. 1 is a system drawing of a web presence management system.

all arranged according to at least some embodiments described herein.

DETAILED DESCRIPTION OF THE PREFERRED EMBODIMENT(S)

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

FIG. 1 is a system drawing of a web presence management system, arranged in accordance with at least some embodiments described herein. A web presence management system ("system") 100 may be implemented with a web presence platform 101. Web presence platform 101 may be a web presence optimization platform. Web presence platform 101 may include a web presence processor 102 and/or a web presence memory 104. Web presence processor 102 may be configured to be in communication with at least a processor 112 and/or a processor 122 through a network 101. Network 101 may be the Internet. Processor 112 may be associated with a marketing channel 110, and may be configured to be in communication with a memory 114. Processor 122 may be associated with a marketing channel 120, and may be configured to be in communication with a memory 124. Memories 114, 124 may be configured to store respective databases and/or service data 116, 126 (further described below), respectively. In some examples, marketing channels 110, 120 may each be associated with a type of web service, such as a video content distributor, a blog content distributor, a social networking platform, or a website search engine, etc. Web presence processor 102 may further be configured to be in communication with an entity device 106 through network 101. Entity device 106 may be a personal computer, a laptop, a tablet computer, a cellular phone, etc. Entity device 106 may be associated with an entity 105 that may be a product or service provider such as a department store, a home improvement store, a clothing company, an automobile manufacturer, an electronics product company, etc.

Web presence processor 102 may be configured to receive a request 150 from entity device 106 through network 101. Request 150 may be a request to generate web presence data 140, where web presence data 140 may include data effective to indicate a web presence (described below) of entity 105. In some examples, request 150 may include an indication of one or more keywords, such as a keyword 152. In some examples, keyword 152 may be, for example, one or more characters, symbols, operators, words, etc. Request 150 may further include indications of one or more web assets, such as web asset 154 and web asset 156. Web asset 154 may be associated with marketing channel 110 and web asset 156 may be associated with marketing channel 120. Some examples of web assets 154, 156 may be a YOUTUBE page of entity 105 on YOUTUBE, a FACEBOOK page of entity 105, a INSTAGRAM account of entity 105, a TWITTER account of entity 105, a website of entity 105, etc. Each web asset may be identified or represented by a corresponding uniform resource locator (URL) and/or a corresponding internet protocol (IP) address. If marketing channel 110 is YOUTUBE, then an identification of web asset 154 may be a URL to access the YOUTUBE page of entity 105, such as "www.youtube.com/videochannel123".

In some examples, marketing channel 110 and marketing channel 120 may be different from each other. Each marketing channel 110, 120 may correspond to a respective domain. For example, marketing channel 110 may correspond to a first domain "www.youtube.com" and marketing channel 120 may correspond to a second domain "www.google.com". Processor 112 of marketing channel 110, in response to a search request for keyword 152 on marketing channel 110, may produce a first search result. The first search result may be identified by a URL including first domain, such as "www.youtube.com/keyword152". Processor 122 of marketing channel 120, in response to a search request for keyword 152 on marketing channel 120, may produce a second search result. The second search result may be identified by a URL including the second domain, such as "www.google.com/keyword152". The first search result may include a URL of web asset 154, such as "www.youtube.com/webasset154" and the second search result may include an URL of web asset 156, such as "www.entity105.com". In some examples, the URL of web asset 154 may also be included in the second search results produced by marketing channel 120. In some examples, the URL of web asset 156 may be present in content associated with web asset 154. For example, some videos in the YOUTUBE page of entity 150 may display a URL of a website of entity 105, or may include the URL of the website in a description of the videos, or in advertisements embedded in the videos, etc.

In examples where marketing channels 110, 120 are different from each other, marketing channels 110, 120 may each index a respective set of web assets. For example, if marketing channel 110 is YOUTUBE, an index 118 stored in memory 114 of marketing channel 110 may index a first set of web assets including web asset 154. If marketing channel 120 is GOOGLE, an index 128 stored in memory 124 of marketing channel 120 may index a second set of web assets including web asset 154 and web asset 156. In some examples, the first set of web assets indexed by marketing channel 110 may be a subset of the second set of web assets indexed by marketing channel 120. In some examples, web assets 154, 156 may be identical, such as a YOUTUBE page of entity 105. In examples where web assets 154, 156 are identical, the web asset may be indexed by both marketing channels 110, 120. For example, a YOUTUBE page of entity 105 may be indexed by both YOUTUBE and GOOGLE, such that a search for keyword 152 on YOUTUBE may return the YOUTUBE page and a search for keyword 152 on GOOGLE may also return the YOUTUBE page. In some examples, a ranking of the YOUTUBE page on the YOUTUBE search result may be different from a ranking of the YOUTUBE page on the GOOGLE search result. In some examples, marketing channels 110, 120 may be identical, such as YOUTUBE. If web assets 154, 156 are different YOUTUBE pages of entity 105, both YOUTUBE pages may be index by GOOGLE such that both YOUTUBE pages may be included in a search result based on a search for keyword 152 in GOOGLE search engine.

A web presence of entity 105 may relate to a presence of entity 105 on the Internet, such as an amount of exposure of entity 105 or of products and/or services related to entity 105. In examples where web asset 156 is a website of entity 105, the web presence of entity 105 may be based on a ranking of a URL corresponding to web asset 156 in a search result produced marketing channel 120, where the search result may be based on keyword 152 in request 150. For example, if entity 105 manufactures smartphones, an URL of web asset 156 may have a first ranking in a search for the keyword "smartphone", but the website may have a second ranking lower than the first ranking in a search for a keyword "car". In examples where web asset 154 is a YOUTUBE page of entity 105 on a video content provider, the web presence of entity 105 may relate to a ranking of an URL of web asset 154 in video search results produced by marketing channel 110. In examples where request 150 includes an indication of keyword 152, request 150 may be a request to generate web presence data 140 based on search results associated with keyword 152 produced by two or more channels such as marketing channel 110 and marketing channel 120.

Web presence processor 102 may be further configured to receive, or retrieve, service data 116 and/or service data 126 from processor 112 and/or processor 122, respectively. In some examples, in response to receiving request 150, web presence processor 102 may request service data 116, 126 from processors 112, 122, respectively. In some examples, processors 112, 122 may send service data 116, 126, to web presence processor 102 periodically. In some examples, service data 116, 126 may be stored in web presence memory 104. In some examples, web presence processor 102 may retrieve service data 116, 126 from web presence memory 104 in response to receiving request 150.

Service data 116 may relate to web asset 154 of entity 105, and service data 126 may be related to web asset 156 of entity 105. In examples where web asset 154 is a YOUTUBE page of entity 105, service data 116 may include the video search ranking of the YOUTUBE page of entity 105 based on a video search for keyword 152. Service data 116 may further include data such as a number of subscribers to the YOUTUBE page, a number of viewers who viewed videos of the YOUTUBE page, a duration in which viewers viewed videos of the YOUTUBE page, etc. In examples where web asset 156 is a website, service data 126 may include a ranking of the URL of the website in website search results based on a keyword. Service data 126 may further include data such as frequency of visits, location of visitors, etc., to the website of entity 105.

Web presence processor 102 may be further configured to generate web presence data 140 based on service data 116, 126 and based on keyword 152 (the generation will be described below). Web presence data 140 may be effective to indicate a web presence of entity 105. In some examples, web presence data 140 may include service data 116, 126 and may further include strategy data 138 (further described below) that may be generated by a strategy module 131 of web presence processor 102. Web presence processor 102 may be further configured to send web presence data 140 to entity device 106 through network 101. Web presence data 140 may be outputted as content in a web presence interface 142, where web presence interface 142 may be displayed on a display of entity device 106. Web presence interface 142 may be a user interface being displayed on entity device 106 such that a user of entity device 106 may use web presence interface 142 to evaluate web presence data 140. In some examples, web presence processor 102 may be further configured to receive an instruction 144 from entity device 106, through network 101, to perform steps intended to modify web presence data 140. As will be described in more detail below, web presence processor 102 may include one or more modules, such as an access control module 130, a strategy module 131, and/or an audience module 132, etc. The one or more modules may be activated by web presence processor 102 in order to implement system 100, generate web presence data 140 and/or modify web presence data 140 based on instruction 144.

Figure 2:
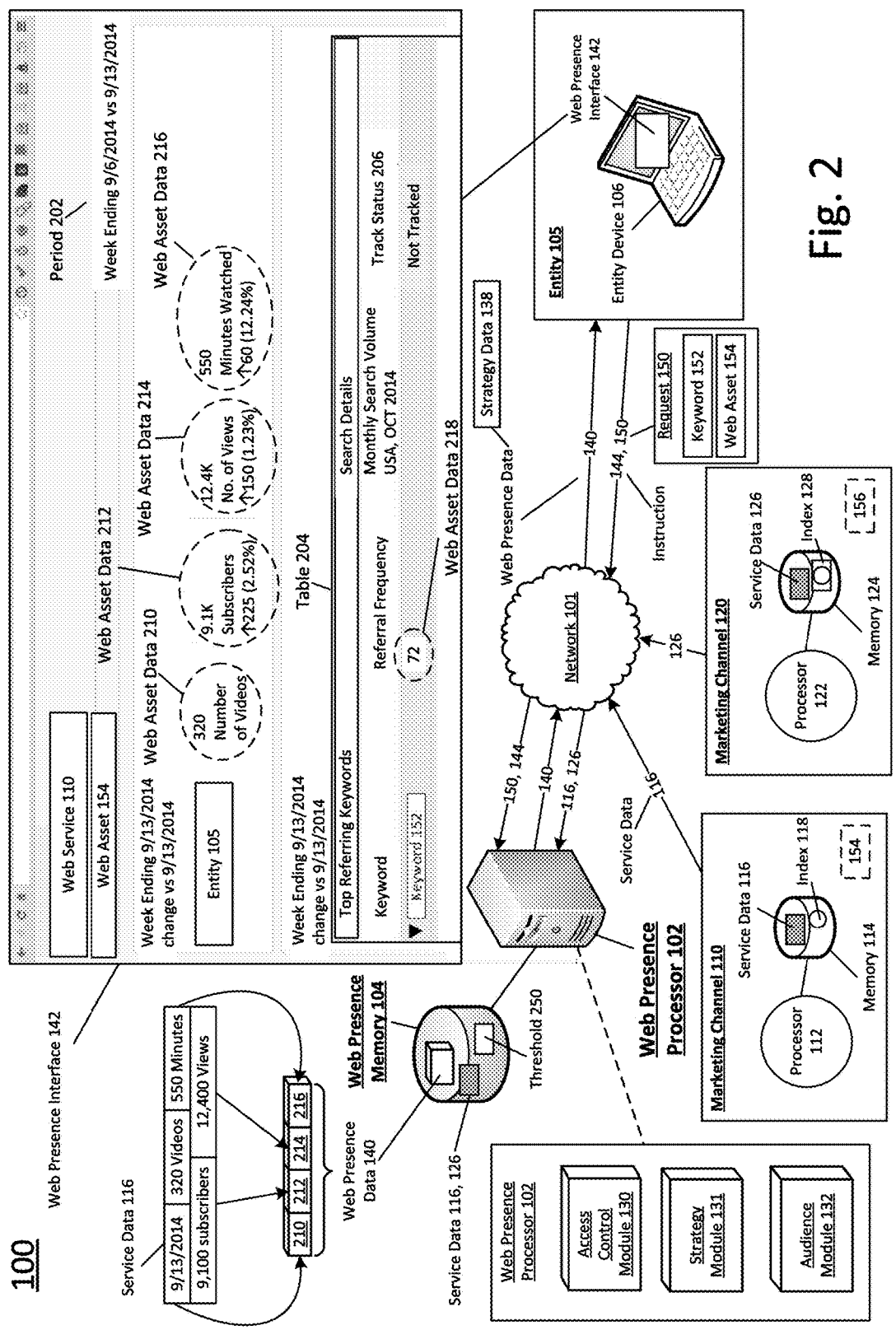
FIG. 2 illustrates an example implementation of the web presence management system of FIG. 1.

FIG. 2 illustrates an example implementation of the web presence management system of FIG. 1, arranged in accordance with at least some embodiments described herein. The system of FIG. 2 is substantially similar to system 100 of FIG. 1, with additional details. Those components in FIG. 2 that are labelled identically to components of FIG. 1 will not be described again for the purposes of clarity.

As depicted, web presence interface 142 may be effective to display web presence data 140 of entity 105, where web presence data 140 may include an indication of keyword 152. Web presence data 140 may include one or more pieces of web asset data 210, 212, 214, 216, 218 (further described below), which may be displayed in web presence interface 142. In an example, marketing channel 110 may be a video content provider and web asset 154 may be a YOUTUBE page of entity 105. Service data 116 may include data effective to indicate a number of videos in the YOUTUBE page, a number of subscribers to the YOUTUBE page, a number of viewers who viewed videos of the YOUTUBE page, a duration in which videos are viewed by viewers, etc. In the example depicted in FIG. 2, service data 116 may indicate "320 videos, 9,100 subscribers, 12,400 views, and 550 minutes". Web presence processor 102 may receive service data 116 and may store service data 116 in web presence memory 104. In some examples, service data 116 may include an indication of a date, such as "9/13/2014" to indicate a date in which service data 116 is recorded by processor 112.

Web presence processor 102 may generate web presence data 140 by transforming portions of service data 116, 126, into web presence data 140. In an example, web presence processor 102 may receive service data 116, 126 and in response, may transform portions of service data 116, 126 into web asset data 210, 212, 214, 216, etc. In the example depicted by FIG. 2, web processor 102 may transform a portion of service data 116 into web asset data 210 such that web asset data 210 may indicate "320 videos" are associated with web asset 154. In some examples, transformation of service data 116, 126 to web asset data 210, 212, 214, 216, etc. may include allocating memory space in web presence memory 104 for the generation of web presence data 140. The allocated memory space may be partitioned into subsets, where each subset may correspond to a web asset data among web asset data 210, 212, 214, 216, 218, etc. Web presence processor 102 may identify a portion, such as "320 videos" in service data 116, and write "320 videos" to a subset of the allocated memory space corresponding to web asset data 210. Identification of the portion of service data 116 may include identifying a particular range of bits or bytes in a packet associated with service data 116. For example, service data 116 may be a 32 byte packet and a number of videos may be indicated by the fourth byte among the 32 bytes.

Web presence processor 102 may further analyze and/or evaluate service data 116 to generate web presence data 140. For example, web presence processor 102 may compare service data 116 received at a first date with service data 116 received at a second date. Based on the comparison, web presence processor 102 may determine whether there is an increase or decrease in data included in service data 116. For example, web presence processor 102 may compare the numbers of subscribers between the first and second dates in order to determine whether a number of subscribers subscribed to the YOUTUBE page of entity 105 increased or decreased between the first and second dates. Web presence processor 102 may generate web presence data 140 by including the determined difference, and changes such as an increase or a decrease, in web presence 140. As depicted in the example in FIG. 2, a time period between the first and second dates may be displayed in web presence interface 142 as period 202.

Web presence processor 102 may store historical data such as service data 116 of different dates in web presence memory 104. In an example, request 150 may be a request to generate web presence data 140 between a first date and a second date. Web presence processor 102 may retrieve service data 116 corresponding to the first date and service data 116 corresponding to the second date from web presence memory 104. After the retrieval of service data 116 corresponding to the two dates, web presence processor 102 may compare or evaluate the retrieved service data 116 to generate web presence data 140 of entity 105. By storing service data 116 in web presence memory 104, web presence processor 102 may generate web presence data 140 to reflect changes in a web presence of entity 105 between weeks, months, years, etc.

Similarly, in an example, marketing channel 120 may be a search engine and web asset 156 may be a website of entity 105. Service data 126 may include data effective to indicate a frequency of visits to the website, locations of users who accessed the website, etc. Web presence processor 102 may receive service data 126 and may store service data 126 in web presence memory 104. In some examples, service data 126 may include an indication of a date to indicate a date in which service data 116 is recorded by service processor 112. Web presence processor 102 may store service data 126 of different dates in web presence memory 104 in order to generate web presence data 140. In some examples, web presence data 140 may include key performance indicators such as revenue, traffic, visits, clicks, associated with web assets of entity 105.

Web presence processor 102 may generate web presence interface 142 and may control which portions of web presence data 140 are to be displayed by web presence interface 142. In some examples, web presence interface 142 may be effective to display a portion of web presence data 140 that may relate to a particular channel and a particular web asset of entity 105. In the example depicted in FIG. 2, web presence interface 142 may display a portion of web presence data 140 associated with keyword 152, web asset 154, and marketing channel 110. Web presence interface 142 may display web asset data 210 as "320 videos", which may indicate that there are "320 Number of Videos" included in a YOUTUBE page of entity 105 on marketing channel 110. Web presence interface 142 may further display web asset data 212 "9.1K Subscribers", which may indicate nine thousand and one hundred users of marketing channel 110 are subscribed to the YOUTUBE page of entity 105 on marketing channel 110. Web presence interface 142 may further display web asset data 214 "12.4K No. of Views", which may indicate a number of views of videos in the YOUTUBE page of entity 105 on marketing channel 110. Web presence interface 142 may further display web asset data 216 "550 Minutes Watched", which may indicate users of marketing channel 110 watched videos of the YOUTUBE page of entity 105 for approximately 550 minutes.

Web presence interface 142 may further display comparison results of service data 116 at different times and/or dates. In the example depicted by FIG. 2, web presence interface 142 may display that a number of subscribers increased by "225" or "2.52%" between the dates indicated by period 202, where the increase is determined by a comparison of service data 116 at different dates performed by web presence processor 102. Similarly, web presence interface 142 may further display that a number of views increased by "150" or "1.23%", and that a number of minutes watched increased by "60" or "12.24%" between the dates indicated by period 202.

Service data 126, received at web processor 102 from marketing channel 120, may further include data effective to indicate a referral frequency of web asset 154 based on keyword 152. For example, an URL of web asset 154 may be included in a search result produced by marketing channel 120. Each occurrence of the URL of web asset 154 in search results produced by marketing channel 120 is a referral frequency. Web processor 102 may transform the referral frequency indicated by service data 126 into web asset data 218, where web asset data 218 indicate the referral frequency of web asset 154 in marketing channel 120. In some examples, web asset data 218 may relate to a referral frequency of the URL of web asset 154 based on a search for keyword 152 on more than one channels different from marketing channel 110.

Web presence interface 142 may further include indicators such as a table 204. Table 204 may be effective to indicate keyword 152 and web asset data 218. The referral frequency indicated by web asset data 218 may be a number of referrals which occurred within period 202. Table 204 may further indicate a track status 206 of each keyword displayed in table 204. In the example depicted in FIG. 2, track status 206 of keyword 152 may indicate whether keyword 152 is being tracked by web presence processor 102 on marketing channel 110. If keyword 152 is tracked by web presence processor 102 on marketing channel 110, service data 116 associated with web asset 154 may further include data corresponding to how web asset 154 is ranked in response to a search on keyword 152 in marketing channel 110. Similarly, if keyword 152 is tracked by web presence processor 102 on marketing channel 120, service data 126 associated with web asset 156 may include data corresponding to how web asset 156 is ranked in response to a search on keyword 152 in marketing channel 120. Web presence processor 102 may activate strategy module 131 to generate strategy data 138 based on web asset data 218 and track status 206 indicated by table 204. Strategy data 138 may be a part of web presence data 140.

Strategy data 138 may include a recommendation for entity device 106 to change track status of one or more keywords in marketing channel 110. Strategy module 131 may be configured to generate strategy data 138 in response to an evaluation of web asset data 218, where the evaluation of web asset data 218 may be performed in response to an identification of track status 206 of a keyword. In an example, strategy module 131 may identify that track status 206 of keyword 152 is "Not Tracked", and in response, may compare the referral frequency indicated by web asset data 218 with a threshold 250. Threshold 250 may be a threshold related to referral frequencies of web asset 154 associated with searches based on one or more keywords. In the example, threshold 250 may be "50", and strategy module 131 may compare "72" indicated by web asset data 218 with "50". In response to "72" being greater than "50", strategy module 131 may generate strategy data 138 to indicate a recommendation to change track status 206 of keyword 152 from "Not Tracked" to "Tracked". If the referral frequency indicated by web asset data 218 is less than threshold 250, strategy module 131 may generate strategy data 138 to indicate a recommendation to keep track status 206 of keyword 152 as "Not Tracked". Similarly, if a track status 206 of a particular keyword is "Tracked" and the referral frequency indicated by web asset data 218 is less than threshold 250, strategy module 131 may generate strategy data 138 to indicate a recommendation to change track status 206 of the particular keyword from "Tracked" to "Not Tracked".

In some examples, web presence interface 142 may be effective to display a portion of web presence data 140 that may relate to a particular keyword, a plurality of channels, and corresponding web assets of entity 105. For example, web presence interface 142 may display web presence data relating to marketing channel 110 or may display service data 116, 126 received from marketing channels 110, 120. Service data from two or more channels may be combined in to illustrate the presence of a particular web asset on multiple channels. For example, web presence processor 102 may determine an average between a first ranking of a first URL of web asset 154 based on keyword 152 with a second ranking of a second URL of web asset 156 based on keyword 152. Web presence processor 102 may include the determined average in web presence data 140, where the determined average may be displayed by web presence interface 142. In some examples, web presence interface 142 may display portions of service data 116, 126 side-by-side such that a user of entity device 106 may select which portions of service data 116, 126 to merge, compare, or evaluate, to generate web presence data 140.

In some examples, strategy data 138 may include simulations and/or models that may indicate an effect of a change of content related to web asset 154 or an effect of a change to track status 206 of keyword 152. Instruction 144 received from entity device 106 may be an instruction to change track status 206 of keyword 152. Web presence processor 102 may detect a change to track status 206 of keyword 152 and in response, may command strategy module 131 to generate or update a simulation or model to show how the change of track status 206 would affect a web presence of entity 105. In some examples, instruction 144 may indicate an anticipated ranking of an URL of web asset 154 based on keyword 152 in order to view how a web presence of entity 105 may change. For example, the user may input a ranking higher than a ranking of the URL of web asset 154 based on keyword 152 indicated by service data 116. Web presence processor 102 may detect the input of the anticipated ranking and may command strategy module 131 to generate or update a simulation of model to show how the anticipated ranking may affect a web presence of entity 105.

In some examples, entity device 106 may be required to login to system 100 to use web presence processor 102. In response to a detection of a login by entity device 106, web presence processor 102 may activate access control module 130 to determine a set of privileges of the entity device 106. For example, access control module 130 may be configured to permit entity device to access or view particular portions of web presence data 140 and/or web presence interface 142.

For example, a first entity device may be permitted to change track status 206 while a second entity device may not have permission to change track status 206. Similarly, the first entity device may be permitted to view a web presence data of unlimited number of channels and keywords, while a second entity device may be permitted to view a limited number of channels and keywords.

In some examples, web presence processor 102 may activate audience module 132 in order to form groups of web presence data. For example, service data 116, 126 may include profile data of users of marketing channel 110, such as locations, age, gender, types of device used, etc. Audience module 132 may be configured to analyze service data 116, 126 and may be configured to form groups of audience based on the indicated locations, age, gender, types of device used, etc. An audience may be users of marketing channels 110, 120 who accessed web assets 154, 156 with use of marketing channels 110, 120. For example, request 150 may be a request to generated web presence data 140 associated with users of marketing channel 110 from a particular location. Web presence processor 102 may activate audience module 132 to generate web presence data 140 based on a portion of service data 116, 126 that may be associated with users from the particular location. In some examples, audience module 132 may be configured to form groups of audience based on the usage of channels by the audience. For example, audience module 132 may identify users who performed searched on both marketing channels 110, 120 and may form an audience to include the identified users.

Figure 3:
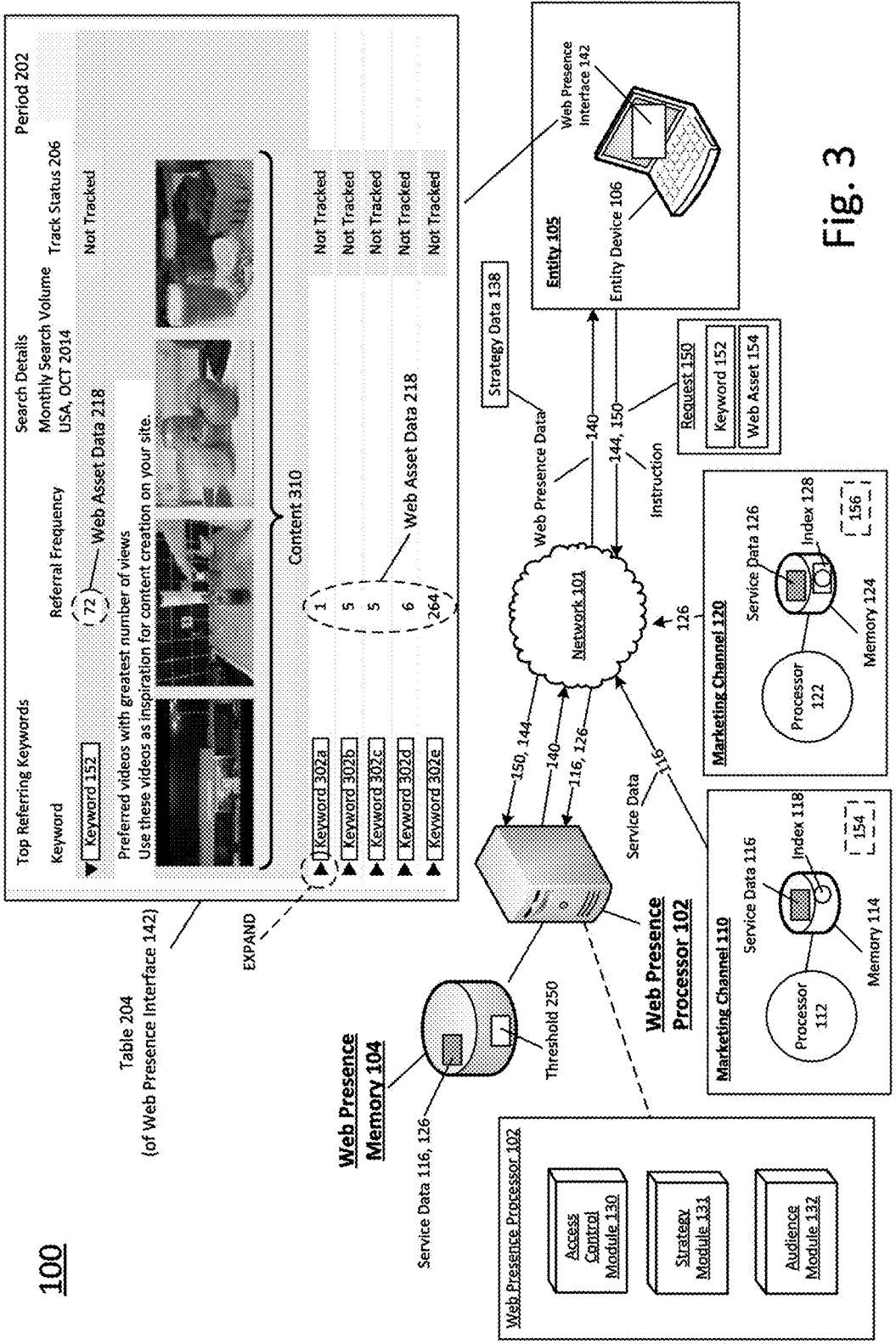
FIG. 3 illustrates a web presence interface with additional details relating to the web presence management system of FIG. 1.

FIG. 3 illustrates a web presence interface with additional details relating to the web presence management system of FIG. 1, arranged in accordance with at least some embodiments described herein. The system of FIG. 3 is substantially similar to system 100 of FIG. 1 and FIG. 2, with additional details. Those components in FIG. 3 that are labelled identically to components of FIG. 1 and FIG. 2 will not be described again for the purposes of clarity.

In some examples, web presence interface 142 may be effective to display a portion of web presence data 140 that may relate to a plurality of keywords, a particular channel, and a particular web asset of entity 105. In an example depicted in FIG. 3, table 204 may further include indications of more than one keywords 302 (including keyword 302a, 302b, 302c, 302d, 302e). Table 204 may include indications of track status 206 for each keyword 302.

In some examples, keywords 302 may be top trending keywords in one or more marketing channels. For example, service data 116 received from marketing channel 110 may include a set of top trending keywords in marketing channel 110 during period 202. Service data 116 may further include referral frequencies corresponding to searches for keywords 302 on marketing channels different from marketing channel 110. Web presence processor 102 may transform the referral frequencies corresponding to keywords 302 into web asset data 218, such that the referral frequencies corresponding to keywords 302 may be displayed. By displaying keywords 302, a user of entity device 106 may view web presence interface 142 and may review which keywords are currently not being tracked by web presence processor 102 on marketing channel 110. In the example, keyword 302e may be significantly greater than threshold 250, which may imply that tracking keyword 302e on marketing channel 110 may be beneficial to entity 105.

In some examples, a user of entity device 106 may view web presence interface 142 and may review keywords being tracked and keywords not being tracked by web presence processor 102 on marketing channel 110 to determine whether to change track status of keywords 152, 302. For example, web processor 102 is currently tracking keywords 302b, 302c, 302d, and not tracking keywords 152, 302e. Web presence interface 142 may show that referral frequencies corresponding to keywords 302b, 302c, 302d, are less than threshold 250, and referral frequencies corresponding to keywords 152, 302e, are greater than threshold 250. Web presence processor 102 may generate strategy data 138 to recommend to stop tracking keywords 302b, 302c, 302d, and to start tracking keywords 152, 302e.

Table 204 may further display content 310, where content 310 may be associated with entities different from entity 105. In some examples, content 310 may be associated with entities who may be competitors of entity 105. In the example, content 310 may be associated with keyword 152. For example, content 310 may be videos of a competitor of entity 105, where content 310 may be ranked higher than web asset 154 in search results based on keyword 152. In some examples, entity device 106 may request web presence data 140 of entity 105 based on a keyword, such as keyword 302a, by selecting keyword 302a in web presence indicator 142. Entity device 106 may access content 310 by using links that may be displayed by web presence interface 142. In some examples, web presence indicator 142 may be effective to display a portion of web presence data 140 that may relate to a plurality of keywords, a plurality of channels, and corresponding web assets of entity 105.

In some examples, strategy data 138 may include recommendations to analyze data associated with content 310 being displayed by web presence interface 142. For example, strategy data 138 may recommend a user of entity device 106 to analyze contents of content 310 to determine how to improve content of web asset 154 to improve a web presence of entity 105 based on web asset 154. A user of entity device 106 may expand a section of table 204 corresponding to a particular keyword in order to view web assets of competitors that ranks higher than web asset 154 in search results based on the particular keyword 152. In some examples, strategy data 138 may include historical data associated with previous changes to web asset 154, 156.

In some examples, web presence processor 102 may selectively output content 310 in table 204, where the outputted content 310 are selected based on keyword 152, types of products associated with entity 105, content of web assets 154, 156 of entity 105, etc. In some examples, instruction 144 received from entity device 106 may include a selection of one or more entities different from entity 105. Web presence processor 102 may receive instruction 144 and in response, may select content 310 based on the entities indicated by instruction 144.

In some examples, a user of entity device 106 may evaluate web presence data 140 using web presence interface 142 to optimize web presence of entity 105 across multiple channels instead of limiting the performance improvement in marketing channels 110, 120. For example, entity device 106, which may be controlled by a user, may review web presence data 140 and based on the review, develop strategy data 138 and propose strategy data 138 by sending instruction 144 to web presence processor 102. Web presence processor 102 may receive instruction 144 along with strategy data 138, and in response, may update web presence data 140 and output the updated web presence data 140 on web presence interface 142. Strategy data 138 developed by entity device 106 may be, for example, changing track status 206 of particular keywords where the referral frequency does not exceed threshold 250.

Among other potential benefits, a system in accordance with the disclosure may provide a system for marketing professionals to market a product or service. A system in accordance with the disclosure may provide information from different channels, in additional to search engines, in order for the marketing professionals to confirm and create strategies to market products and services. A system in accordance with the disclosure may also provide information related to performance of competitors in order for the marketing professionals to evaluate marketing strategies. A system in accordance with the disclosure may also provide information for the marketing professionals to, increase, and balance web presence of products and services across multiple channels. A system in accordance with the disclosure may allow marketing professionals to access data related to an audience that performed searches on multiple channels.

Figure 4:
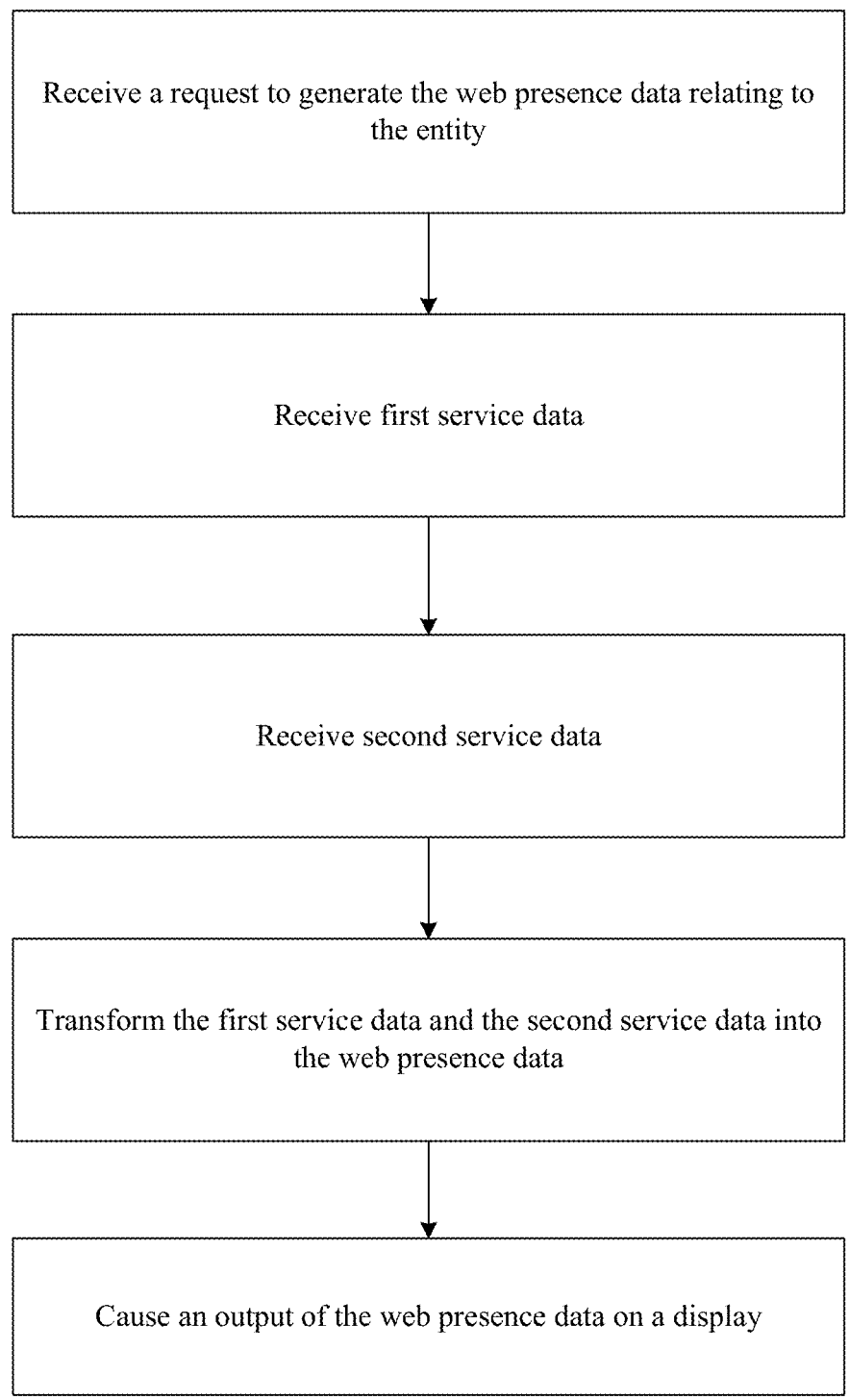
FIG. 4 illustrates a flow diagram for an example process to implement web presence management system.

FIG. 4 illustrates a flow diagram for an example process to implement web presence management system, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, and/or S10. Although illustrated as discrete blocks, various blocks may be divided into additional blocks, combined into fewer blocks, or eliminated, depending on the desired implementation.

Processing may begin at block S2, "Receive a request to generate the web presence data relating to the entity". At block S2, a web presence processor may receive a request to generate the web presence data relating to the entity. In some examples, the request may include indications of one or more keywords.

Processing may continue from block S2 to S4. At block S4, "Receive first service data". At block S4, the web presence processor may receive first service data. In some examples, the web presence processor may receive the first service data from a first processor associated with a first channel. The first service data may relate to a first web asset of the entity. The first web asset may be among a first set of web assets indexed by the first channel. The first channel may be effective to produce a first search result.

Processing may continue from block S4 to S6. At block S6, "Receive second service data". At block S6, the web presence processor may receive second service data. In some examples, the web presence processor may receive the second first service data from a second processor associated with a second channel. The second service data may relate to a second web asset of the entity. The second web asset may be among a second set of web assets indexed by a second channel. The second channel may be different from the first channel. The second set of web assets may be different from the first set of web assets. The second channel may be effective to produce a second search result.

Processing may continue from block S6 to S8. At block S8, "Transform the first service data and the second service data into the web presence data". At block S8, the web presence processor may transform the first service data and the second service data into the web presence data. The web presence data may be effective to indicate one or more keywords and respective track status of the one or more keywords.

Processing may continue from block S8 to S10. At block S10, "Cause an output of the web presence data on a display". At block S10, the web presence processor may cause an output of the web presence data on a display. In some examples, the web presence processor may further generate strategy data effective to recommend changes to respective track status of the one or more keywords. Generation of the strategy data may include comparing web asset data of the first web asset with a threshold. The web asset data may be a part of the web presence data. The threshold may relate to a referral frequency of the first web asset indicated by the second search result. Based on the comparison, the web presence processor may generate the strategy data to change a track status that corresponds to a particular keyword. In some examples, the web presence processor may generate a web presence interface effective to display the web presence data.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating web presence data of an entity, the method comprising, by a web presence processor:
   receiving a request to generate the web presence data relating to the entity;
   receiving first service data, wherein the first service data relates to a first web asset of the entity, the first web asset is among a first set of web assets indexed by a first marketing channel, and the first marketing channel is configured to produce a first search result;
   receiving second service data, wherein the second service data relates to a second web asset of the entity, the second web asset is among a second set of web assets indexed by a second marketing channel, the second marketing channel is different from the first marketing channel, the second set of web assets is different from the first set of web assets, and the second marketing channel is configured to produce a second search result;
   generating the web presence data from the first service data and the second service data, wherein at least some of the first service data and the second service data is transformed into at least some of the web presence data, and wherein the web presence data is configured to indicate one or more keywords and respective track status of the one or more keywords;
   generating audience data that includes profile data of users of the first and second marketing channels; and
   causing an output of the web presence data on a display to display the web presence of the entity across multiple channels.

2. The method of claim 1, wherein the first service data is received from a first processor associated with the first marketing channel, and the second service data is received from a second processor associated with the second marketing channel.

3. The method of claim 1, wherein:
   the first service data is configured to indicate a first ranking of the first web asset in the first search result produced by the first marketing channel; and
   the second service data is configured to indicate a second ranking of the second web asset in the second search result produced by the second marketing channel.

4. The method of claim 1, further comprising generating strategy data effective to recommend changes to respective track status of the one or more keywords.

5. The method of claim 4, further comprising:
   comparing web asset data of the first web asset with a threshold, wherein web asset data is a part of the web presence data, and the threshold relates to a referral frequency of the first web asset indicated by the second search result; and
   based on the comparison, generating the strategy data to change a track status that corresponds to a particular keyword.

6. The method of claim 1, wherein the request includes an indication of a period between a first time and a second time, and the method further comprises:
   retrieving first historical data associated with at least the first web asset, wherein the first historical data corresponds to the first time;
   retrieving second historical data associated with at least the first web asset, wherein the second historical data corresponds to the second time; and
   evaluating the first and second historical data to generate the web presence data.

7. The method of claim 1, further comprising:
   generating a web presence interface configured to display the web presence data;
   detecting a change to a track status that corresponds to a particular keyword;
   in response to the detection, updating the web presence data; and
   causing an output of the updated web presence data on the display.

8. A system configured to generate web presence data of an entity, the system comprising:
   a memory;
   a web presence processor configured to be in communication with the memory, the web presence processor being configured to:
      receive a request to generate the web presence data relating to the entity;
      receive first service data, wherein the first service data relates to a first web asset of the entity, the first web asset is among a first set of web assets indexed by a first marketing channel, and the first marketing channel is configured to produce a first search result;
      store the first service data in the memory;
      receive second service data, wherein the second service data relates to a second web asset of the entity, the second web asset is among a second set of web assets indexed by a second marketing channel, the second marketing channel is different from the first marketing channel, the second set of web assets is different from the first set of web assets, and the second marketing channel is configured to produce a second search result;
      store the second service data in the memory;
      retrieve the first service data and the second service data from the memory;
      generate the web presence data from the first service data and the second service data, wherein at least some of the first service data and the second service data is transformed into at least some of the web presence data, and wherein the web presence data is configured to indicate one or more keywords and respective track status of the one or more keywords;
      store the web presence data in the memory;
      activate an audience module to generate audience data that includes profile data of users of the first and second marketing channels; and
      cause an output of the web presence data on a display to display the web presence of the entity across multiple channels.

9. The system of claim 8, wherein the first service data is received from a first processor associated with the first marketing channel, the second service data is received from a second processor associated with the second marketing channel, and the first and second processors are configured to be in communication with the web presence processor.

10. The system of claim 8, wherein:
the first service data is configured to indicate a first ranking of the first web asset in the first search result produced by the first marketing channel; and
the second service data is configured to indicate a second ranking of the second web asset in the second search result produced by the second marketing channel.

11. The system of claim 8, wherein the web presence processor is further configured to activate a strategy module to generate strategy data effective to recommend changes to respective track status of the one or more keywords.

12. The system of claim 11, wherein the web presence processor is further configured to activate the strategy module to:
compare web asset data with a threshold, wherein web asset data is a part of the web presence data, and the threshold relates to a referral frequency of the first web asset indicated by the second search result; and
based on the comparison, generate the strategy data to change a track status that corresponds to a particular keyword.

13. The system of claim 8, wherein the web presence processor is further configured to:
retrieve first historical data associated with at least the first web asset, wherein the first historical data corresponds to the first time;
retrieve second historical data associated with at least the first web asset, wherein the second historical data corresponds to the second time;
evaluate the first and second historical data to generate the web presence data.

14. The system of claim 8, wherein the web presence processor is further configured to:
generate a web presence interface effective to display the web presence data;
detect a change to a track status that corresponds to a particular keyword;
in response to the detection, update the web presence data; and
cause an output of the updated web presence data on the display.

15. A method for generating web presence data relating to an entity, the method comprising, by a device:
sending a request to a web presence processor to generate the web presence data relating to the entity;
receiving the web presence data from the web presence processor, wherein the web presence data is configured to indicate one or more keywords and respective track status of the one or more keywords, and the web presence data is based on:
a first transformation of first service data, wherein the first service data relates to a first web asset of the entity, the first web asset is among a first set of web assets indexed by a first marketing channel, and the first marketing channel is configured to produce a first search result;
a second transformation of second service data, wherein the second service data relates to a second web asset of the entity, the second web asset is among a second set of web assets indexed by a second marketing channel, the second marketing channel is different from the first marketing channel, the second set of web assets is different from the first set of web assets, and the second marketing channel is configured to produce a second search result;
receiving audience data that includes profile data of users of the first and second marketing channels; and
the method further comprises outputting the web presence data on a display to display the web presence of the entity across multiple channels.

16. The method of claim 15, further comprising:
sending an instruction to the web presence processor to generate strategy data configured to recommend changes to respective track status of the one or more keywords;
receiving an update of the web presence data including the strategy data; and
outputting the updated web presence data on the display.

17. The method of claim 15, wherein:
the request includes an indication of a particular keyword;
the first service data is effective to indicate a first ranking of the first web asset based on the particular keyword; and
the second service data is configured to indicate a second ranking of the second web asset based on the particular keyword.

18. The method of claim 15, further comprising:
sending an instruction to the web presence processor to change a track status that corresponds to a particular keyword;
receiving an update of the web presence data including the change to the track status; and
outputting the updated web presence data on the display.

* * * * *